United States Patent Office 2,803,626
Patented Aug. 20, 1957

2,803,626

4-(2,6-DIAMINO - 4 - PYRIMIDYLAMINO)-PHENYL-ARSINE OXIDE CARBONATE AND CORRESPONDING ISETHIONATE AND PROCESS

Arthur Donald Ainley, Blackley, Manchester, England, assignor to Imperial Chemical Industries Limited, a corporation of Great Britain No Drawing. Application December 4, 1953,
Serial No. 396,302

Claims priority, application Great Britain
December 15, 1952

6 Claims. (Cl. 260—242)

This invention relates to a new trypanocidal substance and more particularly it relates to 4-(2:6-diamino-4-pyrimidylamino)phenylarsine oxide which we have found to be hightly active against *Trypanosoma rhodesiense* infections in experimental animals. It is less toxic than the previously known members of this class and is curative at non-toxic doses in advanced stages of the infection in monkeys in which the central nervous system is already affected.

Thus according to the invention we provide 4-(2:6-diamino-4-pyrimidylamino)phenylarsine oxide and its salts.

This substance is not produced by the processes described for making compounds of this class. Reduction of 4-(2:6-diamino-4-pyrimidylamino)phenylarsonic acid by means of sulphur dioxide and hydrochloric acid in the presence of potassium iodide results in the formation of a mixture of products from which 4-(2:6-diamino-4-pyrimidylamino)phenylarsine dichloride cannot be isolated by the process described for example in Example 5 of United States Patent Specification No. 2,435,393.

We have found that if the crude mixture of products be forthwith hydrolysed 4-(2:6-diamino-4-pyrimidylamino)phenylarsine oxide may readily be isolated from the product in the form of the carbonate.

Thus according to a further feature of the invention we provide a process for the manufacture of 4-(2:6-diamino-4-pyrimidylamino)phenylarsine oxide by reduction of 4-(2:6-diamino-4-pyrimidylamino)phenylarsonic acid by means of sulphur dioxide and hydrochloric acid in the presence of potassium iodide and hydrolysing the 4-(2:6-diamino-4-pyrimidylamino)phenylarsine dichloride so formed, characterised in that the intermediate 4-(2:6-diamino-4-pyrimidylamino)phenylarsine dichloride is not purified and in that the 4-2:6-diamino-4-pyrimidylamino)phenylarsine oxide is isolated in the form of the carbonate.

According to yet a further feature of the invention we provide a process for the manufacture of 4-(2:6-diamino-4-pyrimidylamino)phenylarsine oxide which comprises reaction of p-aminophenylarsine oxide with 2:6-diamino - 4 - chloropyrimidine, the 4 - (2:6-diamino-4-pyrimidylamino)phenylarsine oxide being isolated in the form of the carbonate.

The reaction may conveniently be carried out in an acid medium for example, aqueous hydrochloric acid.

According to yet another feature of the invention we provide a process for the manufacture of 4-(2:6-diamino-4-pyrimidylamino)phenylarsine oxide isethionate which comprises reaction of 4-(2:6-diamino-4-pyrimidylamino)-phenylarsine oxide carbonate with isethionic acid.

The reaction may conveniently be carried out in an aqueous reaction medium.

The isethionate of 4-(2:6-diamino-4-pyrimidylamino)-phenylarsine oxide is a particularly useful salt in that it is sufficiently soluble in water to enable therapeutic doses to be given in solution.

The invention is illustrated but not limited by the following examples in which the parts are by weight:

*Example 1*

14.4 parts of 4-(2:6-diamino-4-pyrimidylamino)phenylarsonic acid are dissolved in 500 parts of concentrated hydrochloric acid and 0.5 part of potassium iodide is added. The solution is warmed to 40° C. and sulphur dioxide is passed through the mixture at this temperature during 2 hours. The product is then allowed to stand, the supernatant liquor is decanted and discarded and 200 parts of water are added to the residue. The mixture is stirred and made alkaline to Brilliant Yellow paper by the addition of 50 parts of 10% aqueous sodium carbonate solution. It is then filtered and the solid is dissolved in 250 parts of a 2% aqueous sodium hydroxide solution. Carbon dioxide is then passed through the solution until it is no longer alkaline to Clayton Yellow paper. It is then filtered and the solid is well washed with water and dried. It consists of 4-(2:6-diamino-4-pyrimidylamino)phenylarsine oxide carbonate as a white powder which decomposes at 273°–275° C.

*Example 2*

A mixture of 5 parts of p-aminophenylarsine oxide, 3.6 parts of 2:6-diamino-4-chloropyrimidine, 6 parts of concentrated aqueous hydrochloric acid and 44 parts of water is boiled under reflux during 5 hours and then cooled to 20° C. and kept at this temperature during 18 hours. 13.5 parts of 40% aqueous sodium hydroxide solution are then added and the mixture is filtered. Carbon dioxide is then passed through the filtrate until it is no longer alkaline to Clayton Yellow paper. It is then filtered and the solid is dissolved in 20 parts of 8% aqueous sodium hydroxide solution. Carbon dioxide is passed through the solution, until it is no longer alkaline to Clayton Yellow paper. It is then filtered and the solid is washed well with water and dried. It consists of 4-(2:6-diamino-4-pyrimidylamino)phenylarsine oxide carbonate as a white powder which decomposes at 273–275° C.

*Example 3*

50 parts of 50% aqueous isethionic acid are added to a mixture of 70 parts of 4-(2:6-diamino-4-pyrimidylamino)phenylarsine oxide carbonate and 800 parts of water, and the mixture is stirred at 20° C. during 18 hours. It is then cooled to 10° C. and filtered. The filtrate is evaporated to dryness at a pressure of 20–25 mms. of mercury, and the residue is then dissolved in 170 parts of methanol and the solution is filtered. The filtrate is evaporated to dryness, finally at a pressure of 1–2 mms. of mercury. The residue consists of 4-2:6-diamino-4-pyrimidylamino)phenylarsine oxide isethionate dihydrate which decomposes at 108° C.

What I claim is:

1. The new compound, 4-2:6-diamino-4-pyrimidylamino)-phenylarsine oxide carbonate.

2. The new compound 4-(2:6-diamino-4-pyrimidylamino)phenylarsine oxide isethionate.

3. A chemical compound selected from the group consisting of 4-(2:6-diamino-4 - pyrimidylamino)phenylarsine oxide carbonate and 4-(2:6-diamino-4-pyrimidylamino)phenylarsine oxide isethionate.

4. A process for the manufacture of 4-(2:6-diamino-4-pyrimidylamino)phenylarsine oxide salts which comprises reducing 4-(2:6-diamino-4-pyrimidylamino)phenylarsonic acid with sulphur dioxide and hydrochloric acid in the presence of potassium iodide to form a crude 4-(2:6-diamino-4-pyrimidylamino)phenylarsine dichloride, hydrolyzing this crude dichloride directly in a form neutral to alkaline medium to obtain the desired 4-2:6-diamino-4-pyrimidylamino)phenylarsine oxide and thereafter isolating said oxide from the hydrolysis mixture by treating same with carbon dioxide.

5. The process of claim 4 further defined by the step of reacting the 4-(2:6-diamino-4-pyrimidylamino)phenylarsine oxide carbonate with isethionic acid whereby 4-(2:6-diamino-4-pyrimidylamino)phenylarsine oxide isethionate is formed.

6. A process as claimed in claim 5 characterised in that the reaction is carried out in an aqueous reaction medium.

References Cited in the file of this patent

UNITED STATES PATENTS

| | | |
|---|---|---|
| 2,386,204 | Friedheim | Oct. 9, 1945 |
| 2,390,089 | Friedheim | Dec. 4, 1945 |
| 2,435,393 | Hamilton et al. | Feb. 3, 1948 |